UNITED STATES PATENT OFFICE.

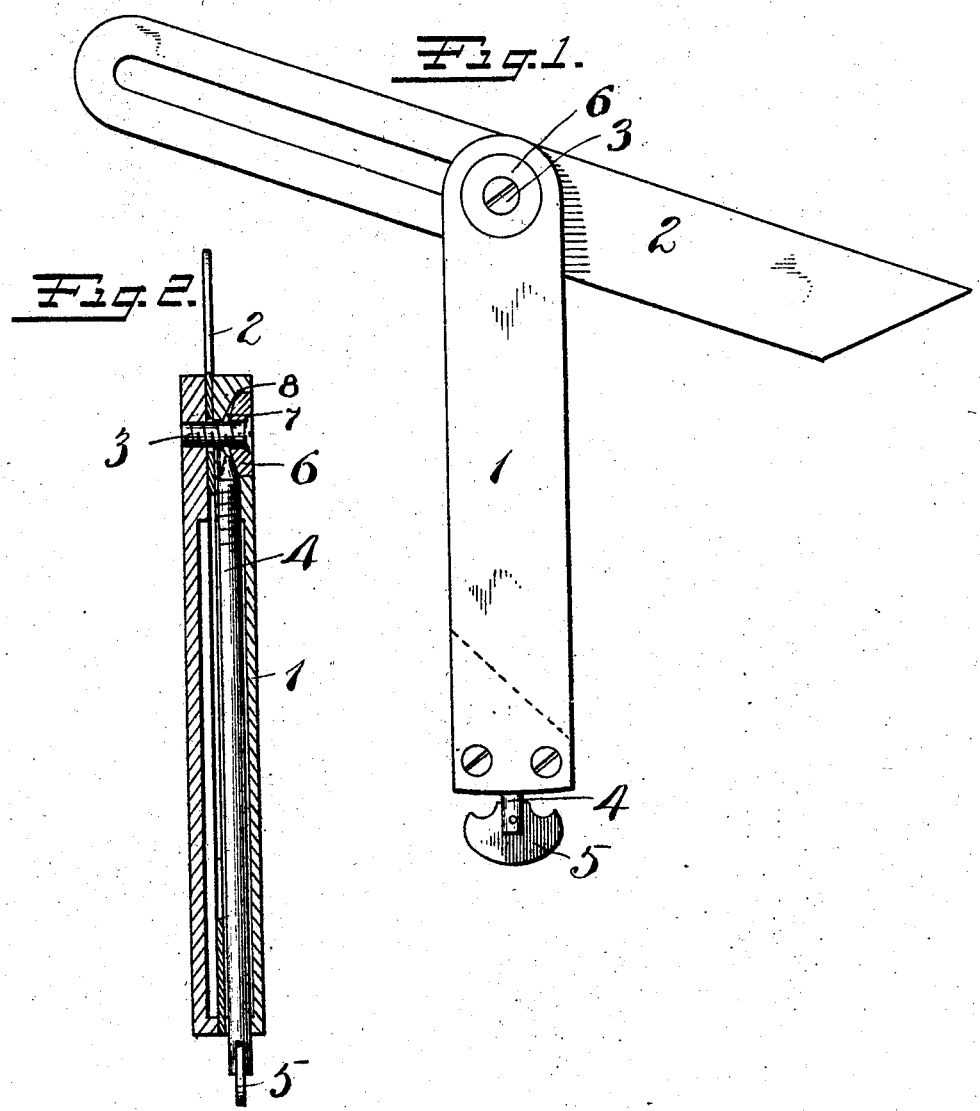

CHRISTIAN BODMER, OF NEW BRITAIN, CONNECTICUT, ASSIGNOR TO STANLEY RULE & LEVEL COMPANY, OF NEW BRITAIN, CONNECTICUT, A CORPORATION OF CONNECTICUT.

BEVEL.

No. 893,223.     Specification of Letters Patent.     Patented July 14, 1908.

Application filed December 13, 1907. Serial No. 406,330.

*To all whom it may concern:*

Be it known that I, CHRISTIAN BODMER, a citizen of the United States, residing at New Britain, Hartford county, Connecticut, have invented certain new and useful Improvements in Bevels, of which the following is a full, clear, and exact description.

This invention relates to improvements in bevels for carpenters and mechanics.

The object of the invention is to provide effective means whereby the blade of the bevel may be set at any desired angle relatively to the handle, and there secured in a very simple manner.

In the drawings, Figure 1 is a plan view of the bevel in one of its operative positions; Fig. 2 is a longitudinal section on the center line of the handle, shown in Fig. 1.

1 is the handle.

2 is the blade. The blade is provided with the usual opening or slot through which a pivot screw 3 passes. The handle 1 is provided with a narrow slot to receive the blade edgewise. In the handle at one side of the slot is what I term a blade-locking screw 4, having a thumb-piece 5 exposed at the rear end of the handle. This screw 4 is threaded in the handle at any suitable point in its length and is provided with a tapered end arranged to take against a blade-locking washer 6, which is so arranged that when the screw 4 is turned it will, through the medium of said washer, cause the blade 2 to be clamped securely at any one of its many angles relatively to the handle.

In the particular form shown in the drawings the washer is rotatably mounted upon the screw 3 and is beveled on one side. The recess 7 in which the locking washer 6 is arranged is provided with a shoulder 8 on the side opposite the screw 4 to allow the washer to seat to the proper depth and to act as a fulcrum to support the washer when it tilts. The screw 4 is preferably provided with a tapered extremity adapted to engage the tapered wall of the washer 6. The blade-locking screw 4, when advanced, presses against the said tapered wall of the washer 6 thus forcing the same outwardly relatively to the side of the handle, the opposite side of washer 6 engaging the shoulder 8. Thus, through the medium of the pivot screw 3, which is secured to the opposite side of the handle, the two sides of the handle slot are drawn together to tightly embrace and hold the blade 2.

In practice it requires a very slight movement of the screw 4 to accomplish the locking and unlocking of the blade. Since no rotation of the pivot screw 3 is required to secure this locking of the blade, there is no danger of disturbing the position of the blade after it has been once adjusted. In Fig. 2 I have shown the edges of the head rounded to accommodate the movement of washer 6.

While both the parts 3 and 6, as shown, have coöperating bevels or inclines, obviously only one of said parts need be beveled, in fact, the invention in its broadest aspect comprehends a variety of modification in the particular method of securing the clamping action.

What I claim is:

A bevel comprising a handle portion having a slot extending longitudinally thereof, a blade adapted to said slot, a slot in the blade, a headed pivot screw carried by the slotted end of the handle and passing through the slot in the blade, a recess in the outer wall of the handle concentric with said pivot screw, a washer rotatably mounted on said pivot screw under the head thereof and in the recess around said screw, a blade locking screw passing longitudinally through the handle, the forward end of said screw coöperating with the under side of said washer to tilt the same to clamp the blade in any adjusted position.

CHRISTIAN BODMER.

Witnesses:
    H. S. WALTER,
    W. J. WORAM.